Patented Nov. 19, 1935

2,021,873

UNITED STATES PATENT OFFICE 2,021,873

PROCESS OF PREPARING VINYL ESTERS

Otto Nicodemus and Walter Weibezahn, Frankfort-on-the-Main-Hochst, Germany, assignors to I. G. Farbenindustrie Aktiengesellschaft, Frankfort-on-the-Main, Germany No Drawing. Application May 15, 1934, Serial No. 725,734. In Germany May 20, 1933

7 Claims. (Cl. 260—106)

The present invention relates to an improved process of preparing vinyl esters.

U. S. Patent No. 1,912,608, dated June 6, 1933, in the name of Walter Weibezahn relates to a process of preparing vinyl esters by the action of acetylene upon aliphatic saturated mono-carboxylic acids in the presence of a mercury compound, which consists in carrying out the reaction in the presence of boron trifluoride, thus considerably promoting the velocity of the reaction.

We have now found that the absorption of acetylene occurs still more rapidly and readily and is terminated in a considerably shorter time by adding boron trifluoride and hydrogen fluoride to the reaction mixture. The shortening of the duration of the reaction thus obtained brings about a substantial improvement of the yield per time and volume.

A further advantage of the new process is that, due to the presence of hydrogen fluoride, the mercury compound has a considerably longer lifetime, so that with the same quantity of the catalyst about twice the quantity of vinyl acetate may be prepared. It may be mentioned that, when operating in the presence of hydrogen fluoride, it is not absolutely necessary to exclude a small quantity of water, as was the case when working according to the former method of carrying out the reaction. It is therefore, also possible to add the hydrogen fluoride in the form of its readily accessible aqueous solution.

The following examples serve to illustrate the invention, but they are not intended to limit it thereto, the parts being by weight:

(1) To 100 parts of acetic acid there are added 0.4 part of mercuric oxide, 0.1 part of boron trifluoride and 0.05 part of hydrogen fluoride in the form of an aqueous solution of 40 per cent. strength, and into this mixture acetylene is introduced at a temperature of between 30° C. and 35° C., while well stirring. After 3 to 4 hours the absorption of acetylene is complete. The solution is mixed with 3 parts of anhydrous sodium acetate and vigorously stirred. After half an hour the solution is filtered and distilled. The yield of vinyl acetate, calculated upon the quantity of acetylene used, amounts to 80 per cent. and more.

(2) 1 kilogram of methoxy-acetic acid is mixed with 14 grams of mercuric oxide, 5 grams of boron trifluoride and 0.1 gram of anhydrous hydrofluoric acid. Into this mixture acetylene is introduced at 29° C. to 34° C., while well stirring, until about 120 to 130 liters of gas have been absorbed, this requiring about 3 hours. The methoxyacetic acid-vinyl ester thus obtained is then distilled under reduced pressure by means of a column, and, after having been freed from small acid portions, it can be obtained in a pure condition by a second careful distillation by means of a well acting column. The boiling point lies at 37.5° C. to 38.5° C. at a mercury pressure of 12 mm. It is a colorless liquid which can be readily polymerized. The yield amounts to about 80 per cent. of the theory.

The residues of the distillation may again be used in the next batch.

(3) To 100 parts of glacial acetic acid there are added 0.4 part of mercuric oxide, 0.15 part of boron trifluoride and 0.1 part of pure hydrofluoric acid. The further treatment with acetylene and the working up are the same as described in Example 1. The yield of vinyl acetate amounts to 80 per cent. and more.

(4) To 100 parts of formic acid there are added 0.5 part of mercuric oxide, 0.08 part of boron trifluoride and 0.1 part of anhydrous hydrofluoric acid. Acetylene is introduced into this mixture at 10° C. to 20° C. After 2 hours 10 parts of sodium carbonate are added and the whole is distilled. The yield of vinyl formate having a boiling point of 42° C. amounts to 50 to 55 per cent.

(5) To 100 parts of crotonic acid there are added 4.2 parts of mercuric oxide (in various charges with intervals), 0.6 part of a solution of 90 per cent. strength of boron trifluoride-crotonic acid in crotonic acid, furthermore 0.6 part of hydrofluoric acid. Acetylene is introduced into this mixture for 7 hours at 60° C., while vigorously stirring. The whole is then mixed with 0.6 part of anhydrous sodium acetate and distilled. The yield of vinyl ester amounts to 55 per cent. of the theory, calculated upon the quantity of acetylene used.

(6) To 100 parts of pure meththio-glycolic acid there are added in various charges at large intervals, 3.4 parts of mercuric oxide and 2.4 parts of a solution of 80 per cent. strength of boron trifluoride-meththio-glycolic acid in an excess of meththio-glycolic acid, furthermore 0.25 part of hydrofluoric acid. Acetylene is introduced into this mixture for 5½ hours at 80° C., while vigorously stirring. 1.6 parts of anhydrous sodium acetate are then added and the vinyl ester of meththio-glycolic acid is thereafter distilled in a yield of 52 per cent. of the theory, calculated upon the avetylene used.

We claim:

1. The process which comprises acting with acetylene upon an aliphatic monocarboxylic acid in the presence of a mercury compound known to promote the reaction, with the addition of boron trifluoride and hydrogen fluoride.

2. The process which comprises acting with acetylene upon a saturated aliphatic mono carboxylic acid in the presence of a mercury compound known to promote the reaction, with the addition of boron trifluoride and hydrogen fluoride.

3. The process which comprises acting with acetylene upon an aliphatic mono carboxylic acid in the presence of mercuric oxide with the addition of boron trifluoride and hydrogen fluoride.

4. The process which comprises acting with acetylene upon a saturated aliphatic mono carboxylic acid in the presence of mercuric oxide with the addition of boron trifluoride and hydrogen fluoride.

5. The process which comprises acting with acetylene upon acetic acid in the presence of mercuric oxide, boron trifluoride and hydrogen fluoride.

6. The process which comprises acting with acetylene upon formic acid in the presence of mercuric oxide, boron trifluoride and hydrogen fluoride.

7. The process which comprises acting with acetylene upon crotonic acid in the presence of mercuric oxide, boron trifluoride and hydrogen fluoride.

OTTO NICODEMUS.
WALTER WEIBEZAHN.